US010847822B2

(12) United States Patent
Maeshima

(10) Patent No.: US 10,847,822 B2
(45) Date of Patent: Nov. 24, 2020

(54) FUEL CELL SYSTEM AND CONTROL METHOD FOR FUEL CELL SYSTEM

(71) Applicant: NISSAN MOTOR CO., LTD., Yokohama (JP)

(72) Inventor: Susumu Maeshima, Kanagawa (JP)

(73) Assignee: NISSAN MOTOR CO., LTD., Yokohama (JP)

(*) Notice: Subject to any disclaimer, the term of this patent is extended or adjusted under 35 U.S.C. 154(b) by 218 days.

(21) Appl. No.: 16/061,716

(22) PCT Filed: Oct. 20, 2016

(86) PCT No.: PCT/JP2016/081140
§ 371 (c)(1),
(2) Date: Jun. 13, 2018

(87) PCT Pub. No.: WO2017/104258
PCT Pub. Date: Jun. 22, 2017

(65) Prior Publication Data
US 2018/0366751 A1 Dec. 20, 2018

(30) Foreign Application Priority Data
Dec. 15, 2015 (JP) ................. 2015-244516

(51) Int. Cl.
H01M 8/04701 (2016.01)
H01M 8/04746 (2016.01)
H01M 8/04302 (2016.01)
H01M 8/04223 (2016.01)
H01M 8/0432 (2016.01)
(Continued)

(52) U.S. Cl.
CPC ... *H01M 8/04738* (2013.01); *H01M 8/04022* (2013.01); *H01M 8/04037* (2013.01); *H01M 8/04201* (2013.01); *H01M 8/04225* (2016.02); *H01M 8/04268* (2013.01); *H01M 8/04302* (2016.02); *H01M 8/04373* (2013.01); *H01M 8/04701* (2013.01); *H01M 8/04776* (2013.01);
(Continued)

(58) Field of Classification Search
CPC ..... H01M 2008/1293; H01M 8/04022; H01M 8/04037; H01M 8/04201; H01M 8/04225; H01M 8/04268; H01M 8/04302; H01M 8/04373; H01M 8/04701; H01M 8/04738; H01M 8/04776; H01M 8/0612; H01M 8/12
See application file for complete search history.

(56) References Cited

U.S. PATENT DOCUMENTS 7,455,920 B2 * 11/2008 Sakai ................ H01M 8/04126
429/414
2003/0134239 A1 7/2003 Beutel et al.
(Continued)

FOREIGN PATENT DOCUMENTS

JP 2004-152757 A 5/2004
JP 2004-164951 A 6/2004
(Continued)

Primary Examiner — Carlos Barcena
(74) Attorney, Agent, or Firm — Foley & Lardner LLP

(57) ABSTRACT

A fuel cell system including a fuel cell; a first combustor coupled to a discharged air side of the fuel cell; a heating device that heats the first combustor; and a warming-up control unit that performs a warming-up control of the fuel cell after warming up the first combustor by the heating device.

9 Claims, 8 Drawing Sheets

(51) Int. Cl.
- *H01M 8/04082* (2016.01)
- *H01M 8/04225* (2016.01)
- *H01M 8/04014* (2016.01)
- *H01M 8/04007* (2016.01)
- H01M 8/0612 (2016.01)
- H01M 8/124 (2016.01)
- H01M 8/12 (2016.01)

(52) U.S. Cl.
CPC ............ *H01M 8/0612* (2013.01); *H01M 8/12* (2013.01); *H01M 2008/1293* (2013.01)

(56) References Cited

U.S. PATENT DOCUMENTS

| | | | |
|---|---|---|---|
| 2004/0081871 A1 | 4/2004 | Kearl et al. | |
| 2005/0074648 A1 | 4/2005 | Arthur | |
| 2006/0083967 A1* | 4/2006 | Sakai | H01M 8/04029 |
| | | | 429/413 |
| 2006/0234094 A1* | 10/2006 | Sakai | B60L 58/34 |
| | | | 429/429 |
| 2007/0243444 A1 | 10/2007 | Zheng et al. | |

FOREIGN PATENT DOCUMENTS

| | | |
|---|---|---|
| JP | 2010-27579 A | 2/2010 |
| JP | 2010-192272 A | 9/2010 |
| JP | 2014-22299 A | 2/2014 |

\* cited by examiner

FUEL CELL SYSTEM AND CONTROL METHOD FOR FUEL CELL SYSTEM

TECHNICAL FIELD

The present invention relates to a fuel cell system and a control method for the fuel cell system.

BACKGROUND ART

JP2010-27579A discloses a discharged air combustor that mixes and combusts an anode off-gas and a cathode off-gas after use with a solid oxide fuel cell. This discharged air combustor changes the gas after use in the fuel cell to a harmless gas to discharge it outside.

SUMMARY OF INVENTION

However, the warming-up of the discharged air combustor is insufficient at an early stage of the warming-up. Thus, there has been a problem that a remaining gas (an anode gas or the anode off-gas) that has remained inside the fuel cell is extruded by temperature rise of the fuel cell, thus being discharged outside without being combusted in the discharged air combustor. The fuel is possibly mixed as an uncombusted gas without combusting at a stage generating the heating gas. There is a problem that this is also discharged outside without being combusted in the discharged air combustor.

An object of the present invention is to provide a fuel cell system that surely combusts a remaining gas and an uncombusted gas to reduce discharge to an outside even at a time of warming-up of a fuel cell, and a control method for the fuel cell system.

A fuel cell system according to one embodiment of the present invention is a fuel cell system including a fuel cell; a first combustor coupled to a discharged air side of the fuel cell; a heating device that heats the first combustor; and a warming-up control unit that performs a warming-up control of the fuel cell after warming up the first combustor by the heating device.

DESCRIPTION OF EMBODIMENTS

Figure 1:
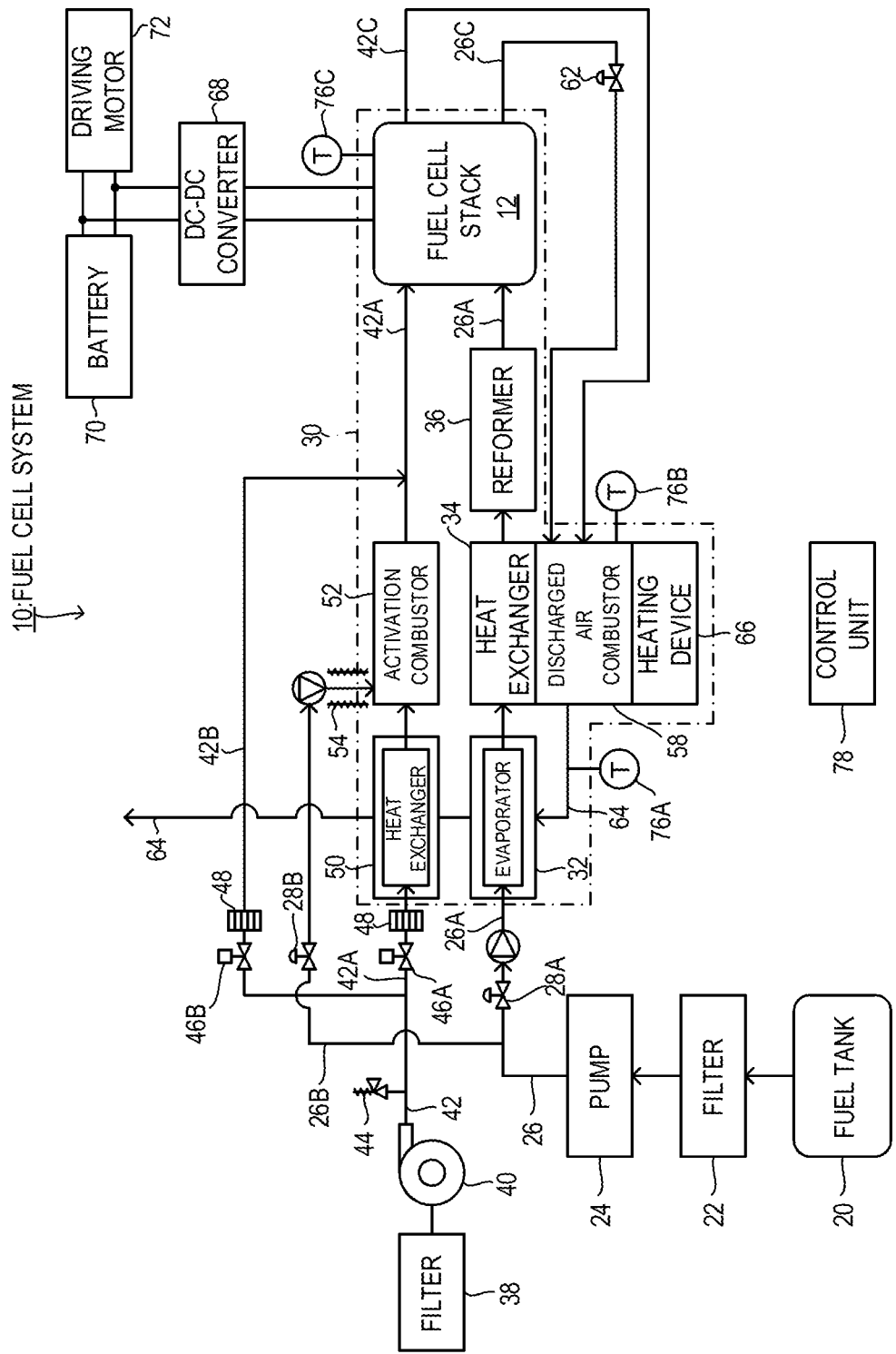
FIG. 1 is a block diagram illustrating a main configuration of a fuel cell system in the embodiment.

The following describes embodiments of the present invention by referring to the drawings.

[Configuration of Fuel Cell System]

FIG. 1 is a block diagram illustrating a main configuration of a fuel cell system 10 according to the embodiment. The fuel cell system 10 in the embodiment is configured of a fuel supply system, a warming-up system, an air supply system, a discharged air system, and a drive system. The fuel supply system supplies an anode gas (a fuel gas) to a fuel cell stack 12. The warming-up system warms up the fuel cell stack 12. The air supply system supplies air to the warming-up system and the fuel cell stack 12. The discharged air system discharges an anode off-gas and a cathode off-gas discharged from the fuel cell stack 12. The drive system extracts electric power from the fuel cell stack 12 to obtain power.

The fuel supply system is configured of a fuel tank 20, a filter 22, a pump 24, an evaporator 32, a heat exchanger 34, a reformer 36, and the like. The warming-up system is configured of an activation combustor 52 (a second combustor) and the like. The air supply system is configured of a filter 38, a compressor 40, a heat exchanger 50, and the like. The discharged air system is configured of a discharged air combustor 58 (a first combustor) and the like. The drive system is configured of a DC-DC converter 68, a battery 70, a driving motor 72, and the like. The fuel cell system 10 includes a control unit 78 (a warming-up control unit, a first warming-up control unit, and a second warming-up control unit) that controls operation of the entire system.

Among the above-described components, the fuel cell stack 12, the evaporator 32, the heat exchanger 34, the reformer 36, the heat exchanger 50, the activation combustor 52, the discharged air combustor 58, and a heating device 66 are housed in a heat insulating member 30 to reduce discharge of heat to the outside and reduce respective decreases of temperature at a time of an electric generation control.

The fuel cell stack 12, which is a solid oxide fuel cell (SOFC), is formed by stacking cells obtained such that an electrolyte layer made of a solid oxide such as a ceramic is interposed into between an anode electrode (a fuel pole) to which an anode gas (a fuel gas) modified by the reformer 36 is supplied and a cathode electrode (an air pole) to which air containing oxygen is supplied as a cathode gas (an oxidizing gas).

Here, an anode includes not only the anode electrode that constitutes the fuel cell stack 12, but also a passage inside the fuel cell stack 12 that supplies the anode gas to the anode electrode and a passage inside the fuel cell stack 12 that discharges the anode off-gas after reaction in the anode electrode. Similarly, a cathode includes not only the cathode electrode that constitutes the fuel cell stack 12, but also a passage inside the fuel cell stack 12 that supplies the cathode gas to the cathode electrode and a passage inside the fuel cell stack 12 that discharges the cathode off-gas after reaction in the cathode electrode.

The fuel cell stack 12 performs electric generation by reacting hydrogen contained in the anode gas with the oxygen in the cathode gas and discharges the anode off-gas and the cathode off-gas that are generated after the reaction. A temperature sensor 76C that measures the temperature inside the fuel cell stack 12 is mounted on the fuel cell stack 12.

A passage 26A, a passage 42A (a supply passage), a passage 260 (a discharge passage), and a passage 42C are coupled to the fuel cell stack 12 (a manifold). The passage 26A supplies the anode gas to the anode of the fuel cell stack 12. The passage 42A supplies a combustion gas to the cathode of the fuel cell stack 12 at a time of warming-up and supplies the cathode gas to the cathode of the fuel cell stack 12 at a time of the electric generation control. The passage 26C introduces the anode off-gas (a fuel off-gas) discharged from the anode of the fuel cell stack 12 into the discharged air combustor 58. The passage 42C introduces the cathode off-gas (an oxidizing off-gas) discharged from the cathode of the fuel cell stack 12 into the discharged air combustor 58. A cutoff valve 62 (a flow passage cutoff valve) is mounted on the passage 26C. The cutoff valve 62 opens the passage 260 at the time of the electric generation control of the fuel cell stack 12, and closes the passage 26C before the warming-up control of the fuel cell system 10, which is described below, and in the stop control.

The fuel tank 20, for example, stores a fuel for modifying composed of a liquid made by mixing ethanol with water. The pump 24 suctions the fuel for modifying to supply the fuel for modifying to the fuel supply system at a predetermined pressure. The filter 22 is disposed between the fuel tank 20 and the pump 24 and removes dust in the fuel for modifying suctioned into the pump 24.

The passage 26 that supplies the fuel for modifying from the fuel tank 20 branches off the passage 26A that supplies the fuel for modifying to the evaporator 32 and a passage 26B that supplies a fuel for heating (the fuel for modifying) to the activation combustor 52. An open/close valve 28A configured to open and close a flow passage of the passage 26A is mounted on the passage 26A. Similarly, an open/close valve 28B is mounted on the passage 26B.

The open/close valve 28B opens the passage 26B at the time of the warming-up control of the fuel cell system 10 to distribute the fuel for heating and closes the passage 26B at an end of the warming-up control. The open/close valve 28A has closed the passage 26A at the time of the warming-up control and opens the passage 26A at the end of the warming-up control to distribute the fuel for modifying.

The evaporator 32 uses the heat of a discharged gas discharged from the discharged air combustor 58 to evaporate the fuel for modifying. The heat is supplied to the heat exchanger 34 from the discharged air combustor 58. The heat exchanger 34 additionally heats the evaporated fuel for modifying to be modified in the reformer 36.

The reformer 36 modifies the fuel for modifying to the anode gas containing hydrogen by catalytic reaction to supply it to the anode of the fuel cell stack 12.

The compressor 40 takes outside air in through the filter 38 to supply the air to the fuel cell stack 12 and the like. A relief valve 44 is mounted on the passage 42 to which the discharged air is supplied by the compressor 40. When the pressure inside the passage 42 exceeds a predetermined value, the relief valve 44 opens the passage 42 to avoid a load equal to or more than a predetermined value posing on the compressor 40. The passage 42 branches off the passage 42A that supplies the air to the heat exchanger 50 and a passage 42B that bypasses the heat exchanger 50 and the activation combustor 52 to join the passage 42A.

A throttle 46A is mounted on the passage 42A. A throttle 46B is mounted on the passage 42B. The respective passages 42A and 42B are configured to adjust a flow rate of the air by the control of the control unit 78. Further, a flashback arrester 48 that holds back flame is mounted on a position that is a downstream of the air with respect to each throttle of each passage. It should be noted that the throttle 46B supplies the air with a predetermined amount to the passage 42A at the time of the warming-up control of the fuel cell stack 12 and closes the passage 42B after the end of the warming-up control.

The heat exchanger 50 uses the heat of the discharged gas discharged from the discharged air combustor 58 to heat the air for the heating gas or the air for the cathode gas.

The air heated by the heat exchanger 50 and the fuel for heating supplied from the passage 26B and heated by an electric heater 54 are supplied to the activation combustor 52, and the activation combustor 52 mixes both, at the time of the warming-up control in the fuel cell system 10. Then, an ignition device attached to the activation combustor 52 ignites a mixture of the air and the fuel for heating to generate the combustion gas at a high temperature. This combustion gas hardly contains oxygen, and a main constituent of the combustion gas is an inert gas. Additionally, this combustion gas has high temperature to provide damage to the fuel cell stack 12. However, the combustion gas is mixed with the air from the passage 42B to be cooled, thus being restricted at a temperature appropriate for warming up the fuel cell stack 12 and becoming the heating gas containing oxygen. It should be noted that, after the end of the warming-up control, generation of the combustion gas and the heating gas ends, and the air that has passed the heat exchanger 50 and the activation combustor 52 is continuously used as the cathode gas to be supplied to the fuel cell stack 12, thus transitioning to the electric generation control.

The discharged air combustor 58 mixes the anode off-gas supplied from the passage 26C with the cathode off-gas supplied from the passage 42C to catalytically combust its mixed gas, generates the discharged gas whose main constituents are carbon dioxide and water, and transmits the heat by the catalytic combustion to the heat exchanger 34 and the like, at the time of the electric generation control. The discharged air combustor 58 combusts the heating gas (containing oxygen) supplied from the passage 42C at the time of the warming-up control to generate the discharged gas similarly to the above description. Furthermore, the discharged air combustor 58 is coupled to a discharged air passage 64 that discharges the discharged gas after combusting. The discharged air passage 64 passes the evaporator 32 and the heat exchanger 50 to be coupled to a muffler (not illustrated). Accordingly, the evaporator 32 and the heat exchanger 50 are heated with the discharged gas.

The heating device 66 heats the discharged air combustor 58, and various heating methods such as resistance heating and induction heating are applicable to the heating device 66. This heating device 66 is driven by the control unit 78 before the warming-up control and heats the discharged air combustor 58 up to the temperature required for the catalytic combustion.

A temperature sensor 76A measures the temperature of the gas that circulates inside the discharged air passage 64. The measurement of the temperature of this gas ensures calculation of the temperature at a catalyst part of the discharged air combustor 58. A temperature sensor 76B measures the temperature of an opening that introduces especially the anode off-gas or the cathode off-gas of the discharged air combustor 58. This can calculate the temperature at the catalyst part of the discharged air combustor 58 before the warming-up control.

The DC-DC converter 68 is coupled to the fuel cell stack 12 and boosts an output voltage of the fuel cell stack 12 to supply electric power to the battery 70 or the driving motor 72. The battery 70 is charged with the electric power supplied from the DC-DC converter 68 and supplies the electric power to the driving motor 72. The driving motor 72 is coupled to the battery 70 and the DC-DC converter 68 via an inverter (not illustrated) to be a power source of a vehicle. At a time of braking of the vehicle, the driving motor 72 generates regenerative electric power and can charge the battery 70 with the regenerative electric power.

The battery 70 and the driving motor 72 will be loads coupled to the fuel cell stack 12 via the DC-DC converter 68. On the other hand, auxiliary machines, such as the pump 24 and the compressor 40, to cause the fuel cell stack 12 to perform the electric generation are also coupled to the fuel cell stack 12 as loads and can be driven by electric power supply from the fuel cell stack 12. These auxiliary machines can be also driven by the electric power supply from the battery 70.

The control unit 78 is constituted of a general-purpose electronic circuit including a microcomputer, a microprocessor, and a CPU, and peripheral devices, and executes a specific program to perform processes for controlling the fuel cell system 10. The control unit 78 can perform a drive/stop control (an ON/OFF control) on the components that constitute the fuel cell system 10. As described below, the control of the fuel cell system 10 performed by the control unit 78 includes a before-warming-up control that warms up the discharged air combustor 58 before warming up the fuel cell stack 12, the warming-up control that warms up the fuel cell stack 12, an electric generation control that performs usual electric generation, and a stop control that stops the system. It should be noted that, although not illustrated, a circuit that applies an electromotive force (an anode protect voltage) whose polarity is inverse to that of the fuel cell stack 12 to the fuel cell stack 12 may be coupled, and a switch control may be performed on this circuit so that the control unit 78 applies the anode protect voltage to the fuel cell stack 12 during the stop control to reduce degradation (oxidation) of the anode (the anode electrode).

[Procedure of Before-Warming-Up Control in Fuel Cell System]

A flowchart illustrating a procedure of the before-warming-up control in the fuel cell system 10 in the embodiment will be described in accordance with FIG. 2.

Figure 2:
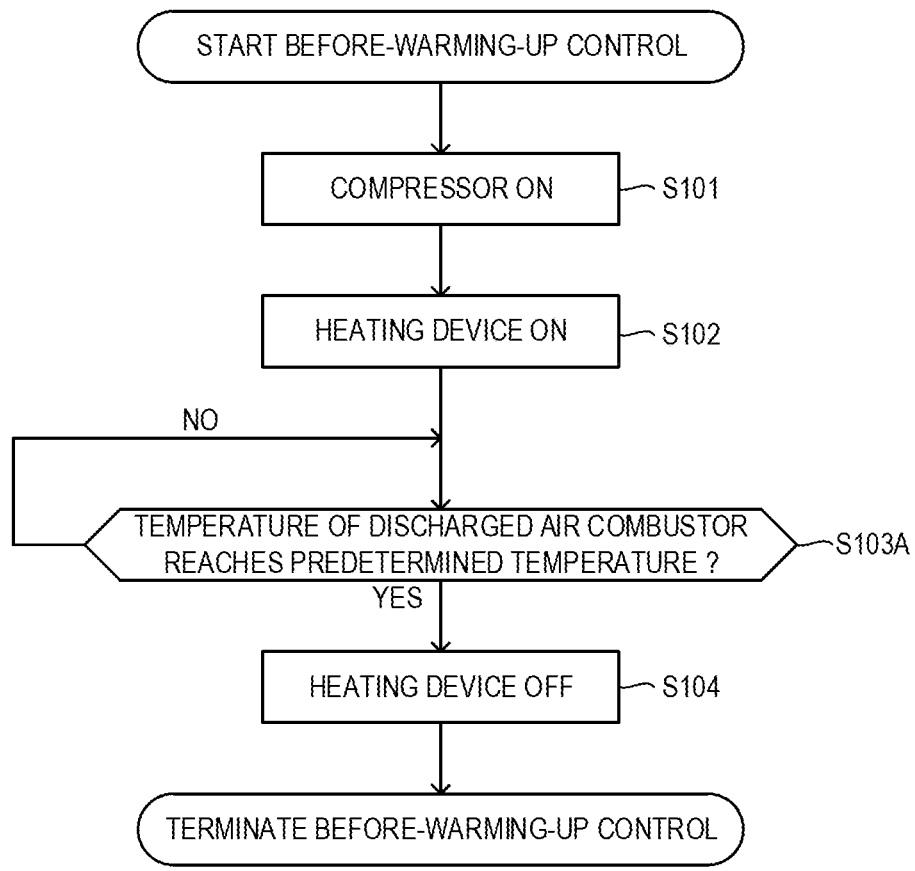
FIG. 2 is a flowchart illustrating a procedure of a before-warming-up control at a time of a usual activation of the fuel cell system in the embodiment.

FIG. 2 is a procedure when the before-warming-up control is performed at a time of a usual activation of the fuel cell system 10 (a state where the fuel cell system 10 is not used for a long time). First, when the system starts the before-warming-up control, the control unit 78 (the warming-up control unit and the first warming-up control unit) turns on the compressor 40 to turn on the throttle 46A (it may also be the throttle 46B) in Step S101. At this time, an opening degree of the throttle 46A is set smaller than that at the time of the later warming-up control. Thus, the gas with a temperature approximately identical to that of the discharged air combustor 58 flows into the discharged air passage 64 in the subsequent stage of the discharged air combustor 58, and the temperature sensor 76A can measure the temperature of this gas.

In step S102, the control unit 78 turns on the heating device 66 to heat the discharged air combustor 58. At this time, the gas inside the discharged air combustor 58 is also heated. In Step S103A, the control unit 78 determines whether the temperature of the discharged air combustor 58 reaches a predetermined temperature that ensures the catalytic combustion or not from the temperature sensed by the temperature sensor 76A, and continues the ON state of the heating device 66 when determining that the temperature of the discharged air combustor 58 has not reached the predetermined temperature yet. On the other hand, when the control unit 78 determines that the temperature of the discharged air combustor 58 has reached the predetermined temperature, the control unit 78 turns off the heating device 66 to end the before-warming-up control in Step S104, thus transitioning to the next warming-up control. At this time, the compressor 40 and the throttle 46A may remain in the ON state.

Figure 3:
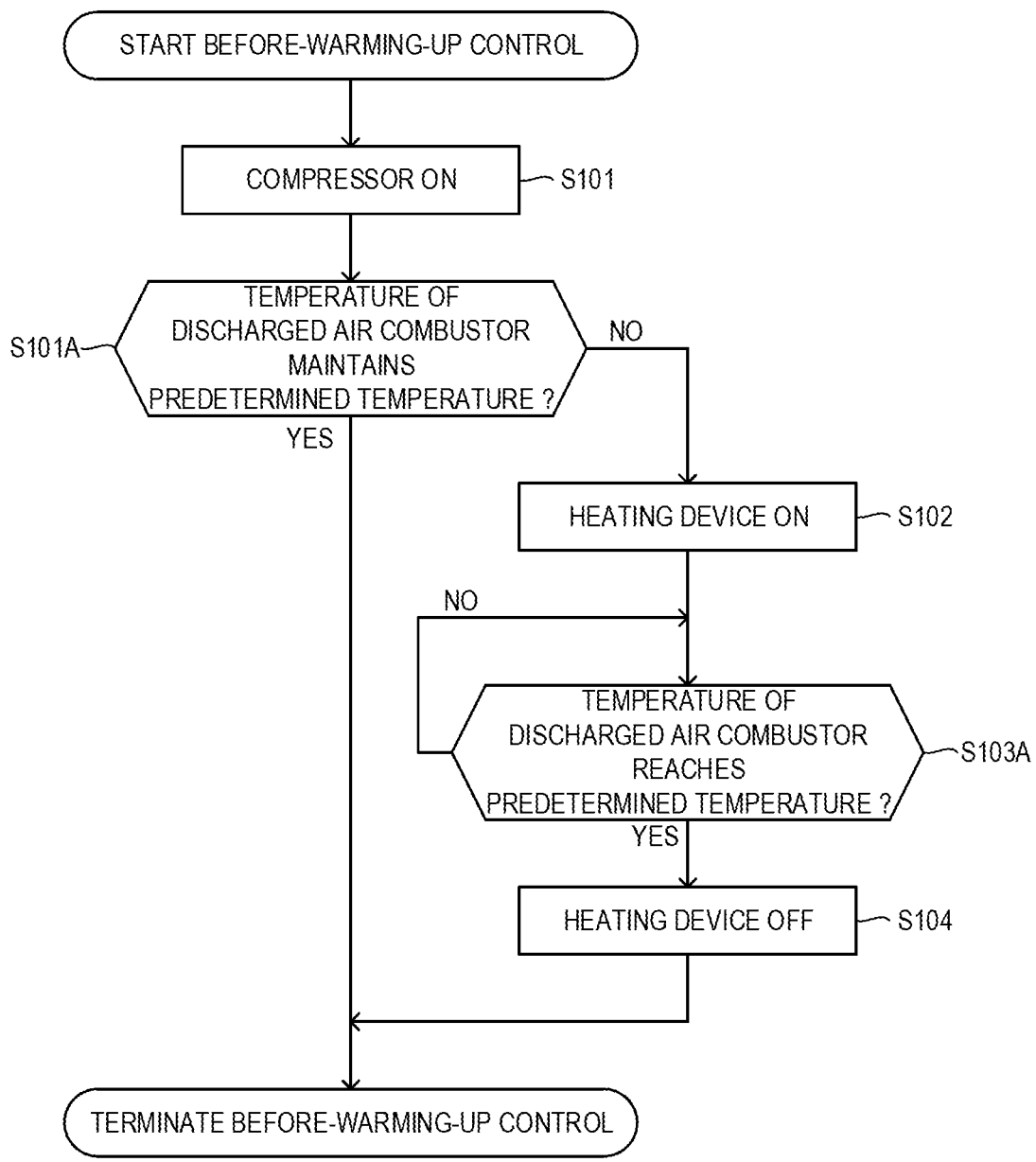
FIG. 3 is a flowchart illustrating a procedure of a before-warming-up control at a time of a reboot of the fuel cell system in the embodiment.

FIG. 3 is a procedure when the before-warming-up control is performed at the time of reboot of the fuel cell system 10 immediately after the end of the stop control of the fuel cell system 10. After step S101, in Step S101A, the control unit 78 determines whether the discharged air combustor 58 maintains the predetermined temperature that ensures the catalytic combustion or not from the temperature sensed by the temperature sensor 76A, and directly ends the before-warming-up control to transition to the next warming-up control when determining that the discharged air combustor 58 maintains the predetermined temperature. On the other hand, when the control unit 78 determines that the temperature of the discharged air combustor 58 is lower than the predetermined temperature, the control unit 78 performs the control in the order of aforementioned Step S102, Step S103A, and S104 to end the before-warming-up control, thus transitioning to the next warming-up control.

Figure 4:
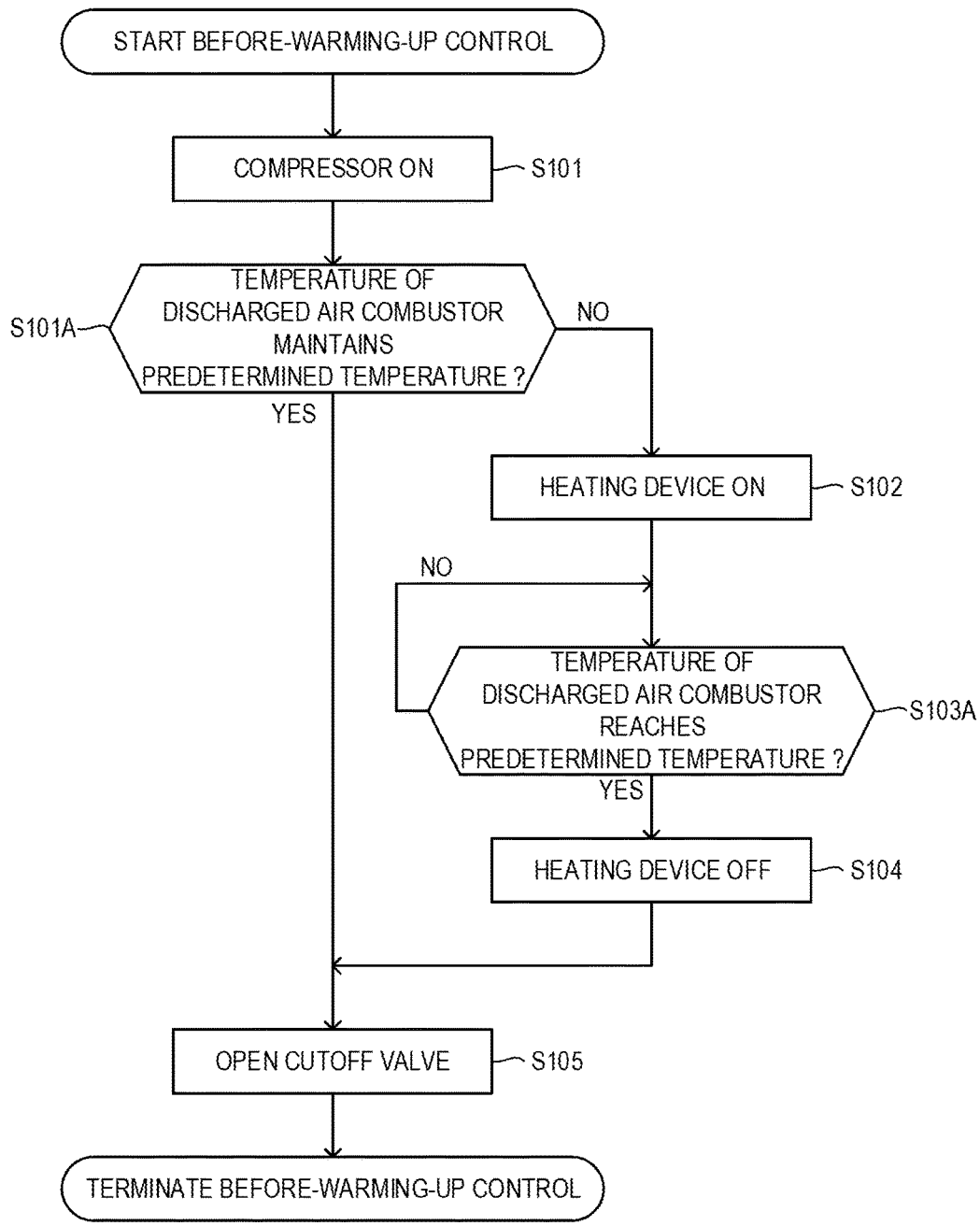
FIG. 4 is a flowchart illustrating a procedure when controlling a cutoff valve mounted on a passage that supplies an anode off-gas or the like to a discharged air combustor in the before-warming-up control of the fuel cell system in the embodiment.

FIG. 4 is a procedure when the cutoff valve 62 mounted on the passage 26C that supplies the anode off-gas and the like to the discharged air combustor 58 is controlled in the before-warming-up control. It is assumed that before Step S101 is performed, the cutoff valve 62 is closed to close the passage 26C. In Step S101A, the control unit 78 determines whether the discharged air combustor 58 maintains the predetermined temperature that ensures the catalytic combustion or not from the temperature sensed by the temperature sensor 76A. Then, when the control unit 78 determines that the discharged air combustor 58 maintains the predetermined temperature, the control unit 78 opens the cutoff valve 62 to open the passage 26C to end the before-warming-up control in Step S105, thus transitioning to the next warming-up control. On the other hand, when the control unit 78 determines that the temperature of the discharged air combustor 58 is lower than the predetermined temperature, the control unit 78 performs the control in the order of aforementioned Step S102, Step S103A, Step S104, and Step S105 to end the before-warming-up control, thus transitioning to the next warming-up control.

Here, after the temperature of the discharged air combustor 58 reaches the predetermined temperature, the cutoff valve 62 is opened to open the passage 26C. Thus, even when the anode gas or the anode off-gas that has remained in the anode of the fuel cell stack 12 reaches the discharged air combustor 58 through the passage 26C, the anode gas or the anode off-gas can be mixed with the air (the oxygen) supplied from the passage 420 to be combusted.

[Procedure of Warming-Up Control in Fuel Cell System]

Figure 5:
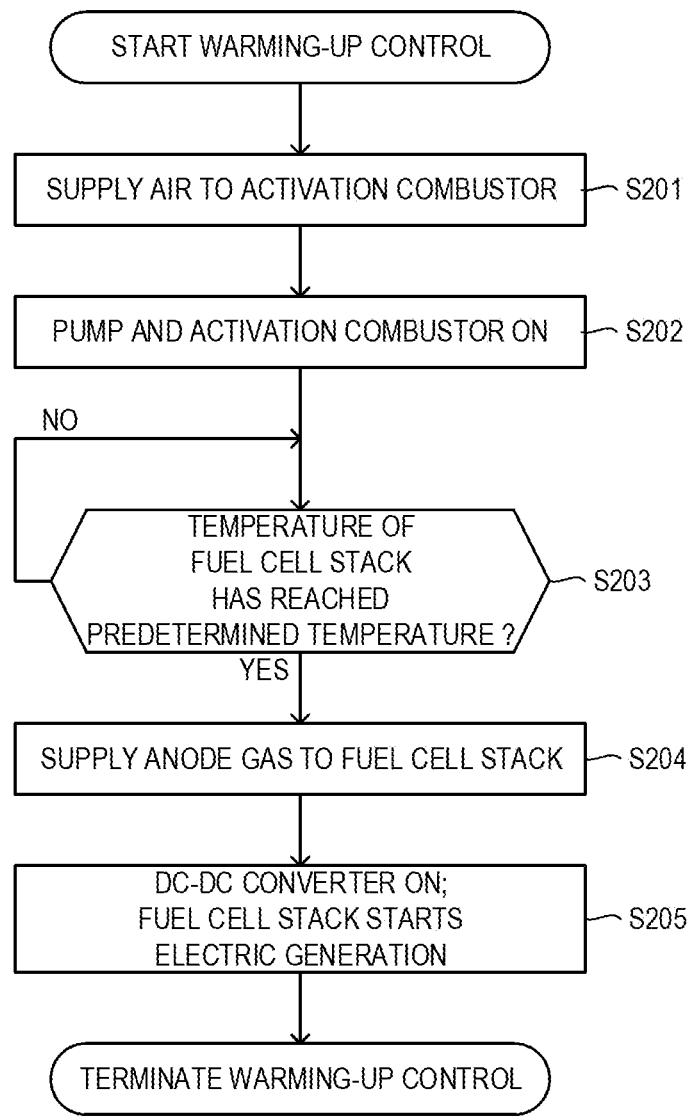
FIG. 5 is a flowchart illustrating a procedure of a warming-up control of the fuel cell system in the embodiment.

The following describes a procedure of the warming-up control in the fuel cell system 10 in accordance with a flowchart in FIG. 5. As described above, the compressor 40 has already been turned on. As illustrated in FIG. 5, when the system starts the warming-up control, the control unit 78 (the warming-up control unit and the first warming-up control unit) opens the throttles 46A, 46B at a predetermined opening degree in Step S201. This supplies the air (the gas for combusting) to the activation combustor 52 and also supplies the air to the passage 42B. When the compressor 40 is not turned on as the aforementioned modification of the before-warming-up control, the compressor 40 is turned on in Step S201.

In Step S202, the control unit 78 turns on the pump 24 and the activation combustor 52 and turns on the open/close valve 28B to open the passage 26B. This supplies the fuel for heating to the activation combustor 52. Then, the fuel for heating is mixed with the air in the activation combustor 52, and the activation combustor 52 ignites it to generate the combustion gas at a higher temperature. This combustion gas mixes with the air joined from the passage 42B to be the heating gas. The heating gas is supplied to the fuel cell stack 12 (the cathode) to warm up (heat) the fuel cell stack 12. These combustion gas and heating gas heat the reformer 36 and the like.

The heating gas that has passed the fuel cell stack 12 passes the discharged air combustor 58, the evaporator 32, and the heat exchanger 50 as the discharged gas to heat them. Here, when the heating gas contains an uncombusted gas by the fuel for heating, an uncombusted gas component of the discharged gas (the heating gas) that has passed the fuel cell stack 12 is combusted in the discharged air combustor 58. The heat exchanger 34 is mainly heated by the heat from the discharged air combustor 58.

In Step S203, the control unit 78 determines whether the temperature of the fuel cell stack 12 has reached an operating temperature required for electric generation or not from the temperature sensed by the temperature sensor 76C.

It should be noted that, also for the evaporator 32, the heat exchanger 34, and the reformer 36, it is normally necessary to determine whether these temperatures have reached temperatures appropriate for properly modifying the fuel for modifying or not. However, these determinations are not necessary when periods for them to reach the appropriate temperatures are shorter than a period for the temperature of the fuel cell stack 12 to reach the operating temperature.

When the control unit 78 determines that the temperature of the fuel cell stack 12 has reached the operating temperature in Step S203, the control unit 78 stops the activation combustor 52, turns off the throttle 46B and the open/close valve 28B to close the passage 26B, and turns on the open; close valve 28A to open the passage 26A in Step S204. Thus, the fuel for modifying becomes the anode gas (the fuel gas) from the fuel tank 20 through the evaporator 32, the heat exchanger 34, and the reformer 36, and then, this anode gas is supplied to the anode of the fuel cell stack 12. On the other hand, the air is continuously supplied from the passage 42A and heated in the heat exchanger 50 to be supplied to the cathode of the fuel cell stack 12 as the cathode gas (the oxidizing gas). Then, electromotive force is generated in the fuel cell stack 12 such that the electrochemical reaction by the anode gas and the cathode gas starts in the fuel cell stack 12. Thus, the fuel cell stack 12 becomes in a state that ensures the electric generation.

Now, at an early stage of the electric generation, the temperature of the fuel cell stack 12 has not reached the temperature where the electric generation is effectively performed, the component transformed to the electric power in the electrochemical reaction is small, and the component transformed to the heat is dominant. Therefore, the control unit 78 (the warming-up control unit and the second warming-up control unit) turns on the DC-DC converter 68 and adjusts the electric power requested for charging the battery 70 (the load) to adjust an amount of electric generation of the fuel cell stack 12, thus causing the fuel cell stack 12 to perform the electric generation in Step S205. The electric power generated by the fuel cell stack 12 charges the battery 70 via the DC-DC converter 68. Thus, the control unit 78 warms up (heats) the fuel cell stack 12 up to the temperature that can increase the component transformed to the electric power in the electrochemical reaction by the heat generated by the fuel cell stack 12 itself. As described above, the warming-up control ends to transition to the electric generation control.

[Operation at Time of Electric Generation Control in Fuel Cell System]

The following describes operation at a time of the electric generation control in the fuel cell system 10. At the time of the electric generation control in the system, the fuel for modifying supplied from the fuel tank 20 is first evaporated by the evaporator 32, the evaporated fuel for modifying is heated by the heat exchanger 34, the heated fuel for modifying is modified to the anode gas in the reformer 36, and this anode gas is supplied to the anode of the fuel cell stack 12. On the other hand, the temperature of the air as the cathode gas is risen by the heat exchanger 50 and passes the activation combustor 52 to be supplied to the cathode of the fuel cell stack 12. The fuel cell stack 12 to which the anode gas and the cathode gas are supplied performs the electric generation by the electrochemical reaction to supply the electric power corresponding to the requested electric power of the battery 70 and the driving motor 72 (the DC-DC converter 68) and further, the requested electric power of the auxiliary machines such as the pump 24 and the compressor 40. The anode off-gas and the cathode off-gas used in the electrochemical reaction are introduced into the discharged air combustor 58. Then, the discharged air combustor 58 combusts the anode off-gas and the cathode off-gas in a mixed state to generate the discharged gas. The discharged gas passes and heats the evaporator 32 and the heat exchanger 50.

[Procedure of Stop Control in Fuel Cell System]

Figure 6:
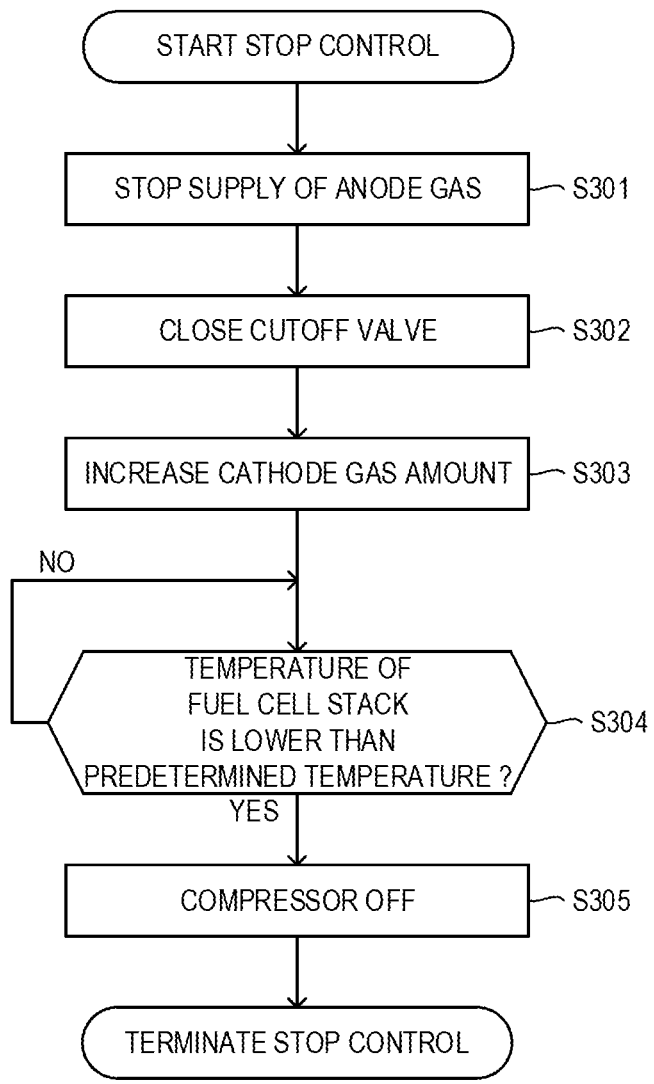
FIG. 6 is a flowchart illustrating a procedure of a stop control of the fuel cell system in the embodiment.

The following describes a procedure of the stop control in the fuel cell system 10 in accordance with a flowchart in FIG. 6. As illustrated in FIG. 6, when the system starts the stop control, the control unit 78 turns off the pump 24 to turn off the open/close valve 28A in Step S301. This stops the supply of the anode gas to stop the electric generation of the fuel cell stack 12. In Step S302, the control unit 78 closes the cutoff valve 62 to close the passage 26C. This prevents the gas containing oxygen from flowing backward in the passage 26C to reduce the degradation of the anode (the anode electrode).

In Step S303, the control unit 78 increases the opening degree of the throttle 46A by a predetermined amount (it is also possible to maintain the opening degree) to cool the fuel cell stack 12 from inside using the air used as the cathode gas, as a gas for cooling.

In Step S304, the control unit 78 measures the temperature of the fuel cell stack 12 to determine whether this temperature has decreased to a predetermined temperature, that is, the upper limit temperature for ensuring avoidance of the degradation (oxidation) of the anode or not. When the control unit 78 determines that this temperature has lowered to a temperature less than the predetermined temperature in Step S304, the control unit 78 turns off the compressor 40 to turn off the throttle 46A in Step S305. In view of this, the stop control ends. Since the passage 26C is closed in Step S302, the anode gas or the anode off-gas remains in the anode of the fuel cell stack 12. However, the anode gas or the anode off-gas is combusted in the discharged air combustor 58 in the next warming-up control.

[Modification of Procedure of Before-Warming-Lip Control in Fuel Cell System]

Figure 7:
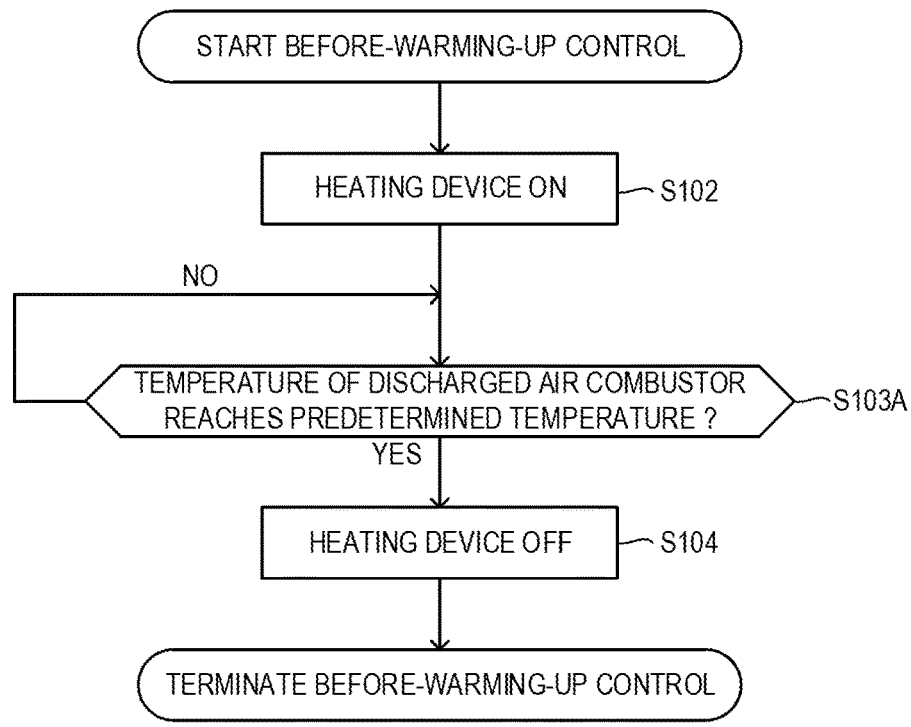
FIG. 7 is a modification of the procedure illustrated in FIG. 2.

FIG. 7 illustrates a modification of the procedure illustrated in FIG. 2, that is, a procedure of the control without the compressor 40. When the system starts a before-warming-up control, the control unit 78 turns on the heating device 66 to heat the discharged air combustor 58 in Step S102. In Step S103B, the control unit 78 determines whether the temperature of the discharged air combustor 58 has reached the predetermined temperature that ensures the catalytic combustion or not from the temperature sensed by the temperature sensor 76B. When the control unit 78 determines that the temperature of the discharged air combustor 58 has not reached the predetermined temperature yet, the control unit 78 continues the ON state of the heating device 66. On the other hand, when the control unit 78 determines that the temperature of the discharged air combustor 58 has reached the predetermined temperature, the control unit 78 turns off the heating device 66 to end the before-warming-up control in Step S104, and then, transitions to the next warming-up control. The compressor 40 is tallied on at a start of the warming-up control.

Figure 8:
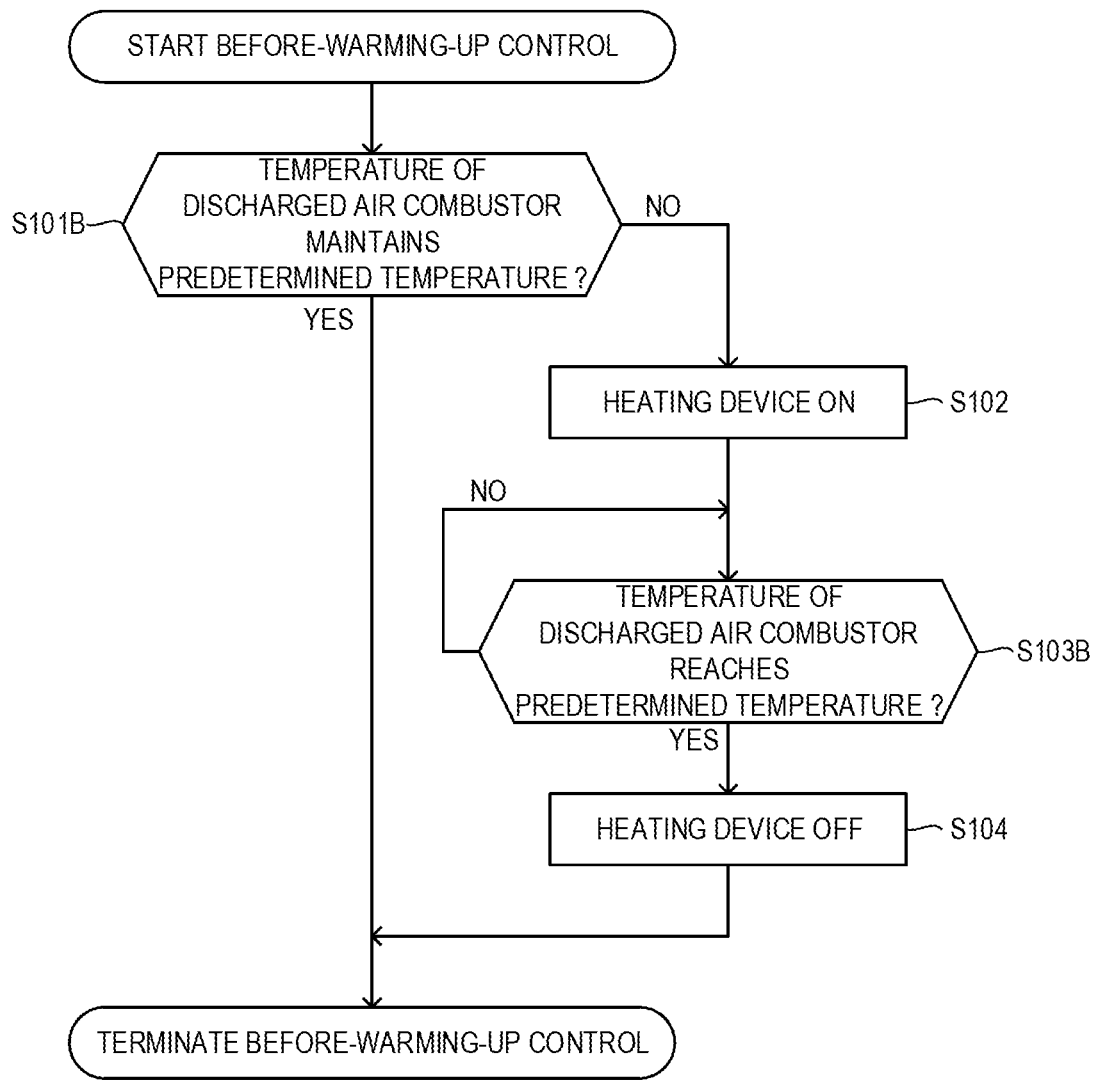
FIG. 8 is a modification of the procedure illustrated in FIG. 3.

FIG. 8 illustrates a modification of the procedure illustrated in FIG. 3, that is, a procedure of the control without the compressor 40. When the system starts the before-warming-up control, the control unit 78 determines whether the discharged air combustor 58 maintains the predetermined temperature that ensures the catalytic combustion or not from the temperature sensed by the temperature sensor 76B in Step S101B. When the control unit 78 determines that the discharged air combustor 58 maintains the predetermined temperature, the control unit 78 directly ends the before-warming-up control to transition to the next warming-up control. On the other hand, when the control unit 78 determines that the temperature of the discharged air combustor 58 is lower than the predetermined temperature, the control unit 78 performs the control in the order from aforementioned Step S102, Step S103B, and Step S104 to end the before-warming-up control, and then, transitions to the next warming-up control. The compressor 40 is turned on at the start of the warming-up control.

[Effect of Fuel Cell System in Embodiment]

The fuel cell system 10 in the embodiment includes the warming-up control unit (the control unit 78) that performs the warming-up control of the fuel cell (the fuel cell stack 12) after warming up the first combustor (the discharged air combustor 58) by the heating device 66. That is, according to the fuel cell system 10 and its control method in the embodiment, after the discharged air combustor 58 coupled to the discharged air side of the fuel cell stack 12 is warmed up, the warming-up control is performed on the fuel cell stack 12. This can surely combust the anode gas or the anode off-gas (the remaining gas) remained in the fuel cell stack 12 by the discharged air combustor 58 during the warming-up control of the fuel cell stack 12.

The fuel cell system 10 in the embodiment includes the second combustor (the activation combustor 52) disposed on the supply passage (the passage 42A) that supplies the oxidizing gas (the cathode gas) to the fuel cell (the fuel cell stack 12), and the warming-up control unit (the control unit 78) includes the first warming-up control unit (the control unit 78) that performs the warming-up control on the fuel cell (the fuel cell stack 12) by the second combustor (the activation combustor 52). Thus, even if the uncombusted gas that is an uncombusted and remaining fuel is mixed into the combustion gas generated by the activation combustor 52, the discharged air combustor 58 that has already been warmed up can combust it.

The fuel cell system 10 in the embodiment includes the load (the battery 70) coupled to the fuel cell (the fuel cell stack 12), and the warming-up control unit (the control unit 78) includes the second warming-up control unit (the control unit 78) that adjusts the electric power supplied from the fuel cell (the fuel cell stack 12) to the load (the battery 70) to warm up the fuel cell (the fuel cell stack 12). Here, the warming-up control unit (the control unit 78) performs the control by the second warming-up control unit (the control unit 78) after performing the control by the first warming-up control unit (the control unit 78). This can surely rise the temperature of the fuel cell stack 12 up to the temperature required for the usual electric generation control using heat generation in accordance with the electric generation of the fuel cell stack 12 itself. The remaining gas and the uncombusted gas that pass through the fuel cell stack 12 after the activation of the fuel cell system 10 and until performing the electric generation can be surely combusted in the discharged air combustor 58. Thus, the remaining gas and the uncombusted gas are not discharged to the outside.

The warming-up control unit (the control unit 78) starts the warming-up control of the fuel cell (the fuel cell stack 12) on the basis of the temperature of the first combustor (the discharged air combustor 58). The temperature of the first combustor (the discharged air combustor 58) is evaluated on the basis of the temperature measured by the temperature sensor 76A disposed on the position that is the downstream of the gas with respect to the first combustor (the discharged air combustor 58). This can measure the temperature of the discharged air combustor 58 with high accuracy. In this case, the air is flowed into the cathode of the fuel cell stack 12. Thus, if the anode gas or the anode off-gas flowed into the discharged air combustor 58, the discharged air combustor 58 can combust it so far as the temperature of the discharged air combustor 58 has reached the temperature required for the catalytic combustion.

The warming-up control unit (the control unit 78) starts the warming-up control of the fuel cell (the fuel cell stack 12) on the basis of the temperature of the first combustor (the discharged air combustor 58). The temperature of the first combustor (the discharged air combustor 58) is measured by the temperature sensor 76B disposed on the inlet of the gas of the first combustor (the discharged air combustor 58). This can directly measure the temperature of the discharged air combustor 58 without flowing the air into the cathode of the fuel cell stack 12.

The fuel cell system 10 in the embodiment includes the flow passage cutoff valve (the cutoff valve 62) mounted on the discharge passage (the passage 26C) that supplies the fuel off-gas (the anode off-gas) discharged from the fuel cell (the fuel cell stack 12) to the first combustor (the discharged air combustor 58). The warming-up control unit (the control unit 78) controls the flow passage cutoff valve (the cutoff valve 62) after warming up the first combustor (the discharged air combustor 58), thus opening the discharge passage (the passage 26C). This prevents the anode gas or the anode off-gas that remains in the anode of the fuel cell stack 12 from flowing into the discharged air combustor 58 in the before-warming-up control, and can surely combust the anode gas or the anode off-gas in the warming-up control.

The embodiments of the present invention described above are merely illustration of some application examples of the present invention and not of the nature to limit the technical scope of the present invention to the specific constructions of the above embodiments.

The present application claims a priority of Japanese Patent Application No. 2015-244516 filed with the Japan Patent Office on Dec. 15, 2015, and all the contents of which are hereby incorporated by reference.

The invention claimed is:

1. A fuel cell system comprising:
 a fuel cell;
 an anode gas supply device that supplies an anode gas to the fuel cell;
 a first combustor coupled to a discharged air side of the fuel cell;
 a heating device that heats the first combustor;
 a flow passage cutoff valve in a discharge passage that supplies a fuel off-gas discharged from the fuel cell to the first combustor; and
 a warming-up control unit programmed to perform a warming-up control of the fuel cell after warming-up the first combustor by the heating device,
 wherein the warming-up control unit is programmed to control the flow passage cutoff valve to open the discharge passage after warming up the first combustor.

2. The fuel cell system according to claim 1, comprising
 a second combustor disposed on a supply passage that supplies an oxidizing gas to the fuel cell, wherein
 the warming-up control unit includes a first warming-up control unit programmed to perform the warming-up control on the fuel cell by the second combustor.

3. The fuel cell system according to claim 2, comprising
 a load coupled to the fuel cell, wherein
 the warming-up control unit includes a second warming-up control unit programmed to adjust an electric power supplied from the fuel cell to the load to warm up the fuel cell.

4. The fuel cell system according to claim 3, wherein
 the warming-up control unit is programmed to start the warming-up control of the fuel cell on a basis of a temperature of the first combustor.

5. The fuel cell system according to claim 1, wherein
 a temperature of the first combustor is measured by a temperature sensor disposed at a position that is downstream from the first combustor.

6. The fuel cell system according to claim 1, wherein
 a temperature of the first combustor is measured by a temperature sensor disposed on an inlet of a gas of the first combustor.

7. A control method for a fuel cell system comprising:
 controlling, with a warming-up control unit, a flow passage cutoff valve in a discharge passage that supplies a fuel off-gas discharged from a fuel cell to a first combustor; and
 performing, with the warming-up control unit, a warming-up control of the fuel cell after warming-up the first combustor by a heating device;
 wherein the warming-up control unit controls the flow passage cutoff valve to open the discharge passage after warming-up the first combustor.

8. The control method for the fuel cell system according to claim 7, comprising
 performing the warming-up control on the fuel cell by a second combustor disposed on a supply passage that supplies an oxidizing gas to the fuel cell.

9. The control method for the fuel cell system according to claim 8, comprising
 warming up the first combustor to perform the warming-up control on the fuel cell, and subsequently starting an electric generation control of the fuel cell.

* * * * *